United States Patent [19]
Lee et al.

[11] Patent Number: 5,539,600
[45] Date of Patent: Jul. 23, 1996

[54] WRITE PROTECTION FOR MEMORY DISKETTES

[75] Inventors: Ritchie J. Lee, Harrisburg; Charles F. DeWitt, Concord; Walter L. Coppedge, Charlotte, all of N.C.

[73] Assignee: Verbatim Corporation, Charlotte, N.C.

[21] Appl. No.: 319,623

[22] Filed: Oct. 7, 1994

[51] Int. Cl.⁶ .......................... G11B 23/03; G11B 19/04
[52] U.S. Cl. ............................................. 360/133; 360/60
[58] Field of Search ...................... 360/60, 133; 369/291

[56] References Cited

U.S. PATENT DOCUMENTS

| | | | |
|---|---|---|---|
| 4,995,029 | 2/1991 | Kohayashi et al. | 369/291 |
| 5,040,167 | 8/1991 | Tanaka et al. | 369/291 |
| 5,091,815 | 2/1992 | Suzuki | 360/133 |
| 5,091,901 | 2/1992 | Yamamoto et al. | 369/291 |
| 5,121,279 | 6/1992 | Saeki et al. | 360/133 |
| 5,150,269 | 9/1992 | Iwaki et al. | 360/133 |
| 5,210,671 | 5/1993 | Blakstone | 360/133 |
| 5,331,499 | 7/1994 | Marcusen | 360/60 |
| 5,367,422 | 11/1994 | Fujisawa et al. | 360/133 |

FOREIGN PATENT DOCUMENTS

| | | | |
|---|---|---|---|
| 0332214 | 9/1989 | European Pat. Off. | |
| 6-195938 | 7/1994 | Japan | 360/60 |
| WO89/08312 | 8/1989 | WIPO | |

*Primary Examiner*—Stuart S. Levy
*Assistant Examiner*—Jefferson Evans
*Attorney, Agent, or Firm*—Edward B. Weller; Albert C. Smith

[57] ABSTRACT

A slide component is configured to be inserted into a recess in an assembled magnetic diskette cartridge and rotated about an edge of the slide component into operable orientation to be slideably positioned between locations in the recess that designate whether or not the magnetic disk in the cartridge is write-protected.

5 Claims, 3 Drawing Sheets

WRITE PROTECTION FOR MEMORY DISKETTES

RELATED PATENT

The subject matter of this application relates to the subject matter of U.S. Pat. No. 5,210,671, which is incorporated herein by this reference.

FIELD OF THE INVENTION

This invention relates to 3.5" magnetic diskettes, and, more particularly, to a snap-in module for selectively providing write protection following manual or automated insertion and manipulation into position on the diskette.

BACKGROUND OF THE INVENTION

Many designs of 3.5" diskette packages contain a magnetic disk which is disposed to rotate while portions of the disk surfaces are in contact with magnetic transducers. Such magnetic diskette may be used once for recording information permanently and thereafter may be altered slightly via a write-protect tab to inhibit recording on the diskette thereafter. Such write-protect tab (or similar device) is usually located near a peripheral edge of the diskette package to be sensed by a transducer which determines whether a tab (or similar device) is in a particular location or not on the diskette package as the indication of whether or not the magnetic diskette is to be protected against further recording thereon. In some diskette designs, a tab may be omitted from a peripheral recess to indicate the write-protect condition in normal use, and in other diskette designs a slide device is included within a peripheral recess to indicate the write-protect condition in one slide position and an unprotected condition in another slide position. This latter diskette design greatly facilitates the alterable protection condition and the reusability of diskettes previously write-protected. A slide component for indicating a write protect or write unprotect condition is introduced into a peripheral recess of the diskette where such slide components is retained captive within slide tracks, or the like. Some end uses of the diskettes, such as duplicators, do not require the use of an alterable protection condition. However, for such end uses, it may be cost efficient to produce a diskette that is identical to the diskettes having the alterable protection condition except that a slide component is not introduced into the recess. After such diskettes are assembled, it may become desirable to add a slide component to the diskette. Present methods of inserting the slide component into the diskette require the housing package of the diskette to be pried apart, the slide component inserted into the recess, and the housing package resealed. This contributes to reject rate in automatic assembly procedures.

SUMMARY OF THE INVENTION

Accordingly, the preferred embodiment of the present invention includes a slideable component that is operable to indicate the write-protection condition of the diskette and that is insertable into a peripheral recess in the diskette package after the housing components which form the diskette package are firmly sealed together. In one embodiment, the slide component has a substantially rectangular body with two legs mounted thereto on opposite ends of a common edge of the body. The legs are of different lengths and a side of the body adjacent the shorter leg is chamfered to facilitate inserting the slide component into the peripheral recess for positioning the assembled diskette package without permanent deformation of the slide component or package. Once snapped into place, the slide component remains captivated therein but slideable between two locations in the recess.

DESCRIPTION OF THE PREFERRED EMBODIMENT

Figure 1:
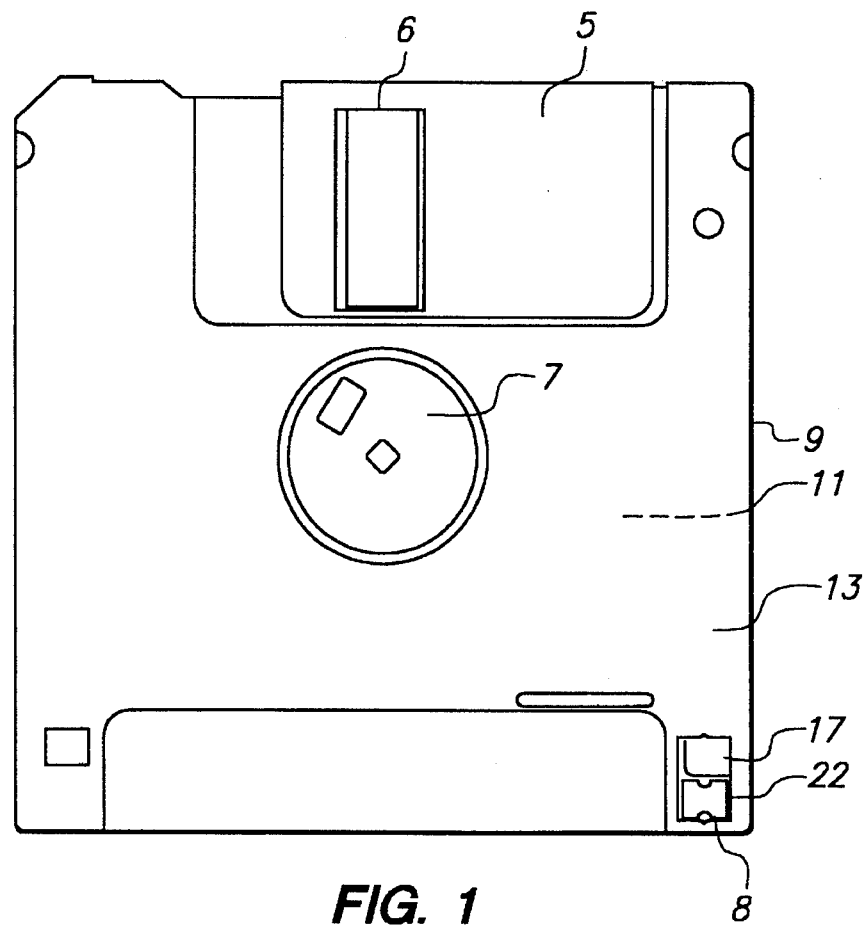
FIG. 1 is a bottom view of a diskette housing or cartridge illustrating a write-protect slide component within the aperture of a peripheral recess in a diskette housing.
Figure 2:
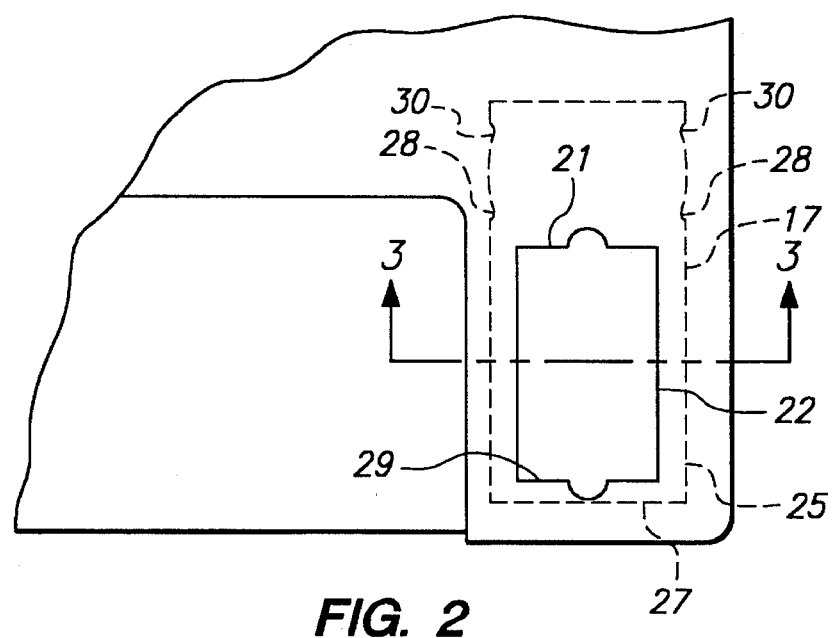
FIG. 2 is an expanded view illustrating the peripheral recess in the diskette housing of FIG. 1.
Figure 3:
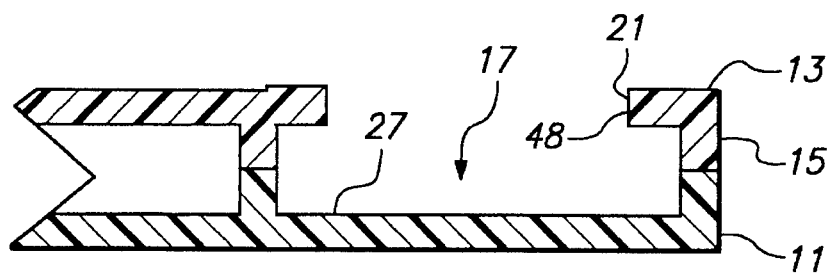
FIG. 3 is a sectional view of the peripheral recess of FIG. 2.
Figure 4:
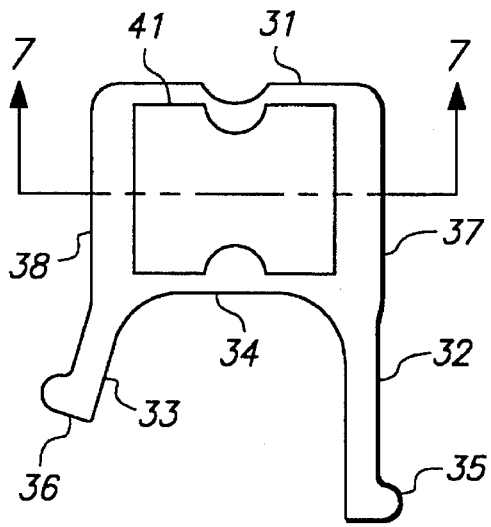
FIG. 4 is a top plan view of the slide component of FIG. 1.
Figure 5:
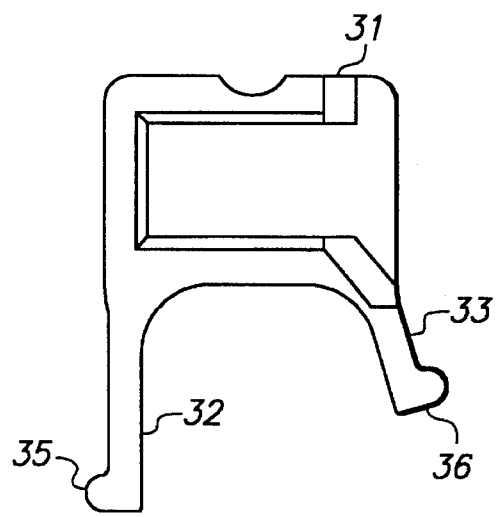
FIG. 5 is a bottom plan view of the slide component of FIG. 1.
Figure 6:
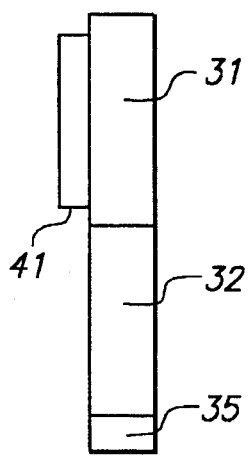
FIG. 6 is an edge view of the slide component of FIG. 1.
Figure 7:
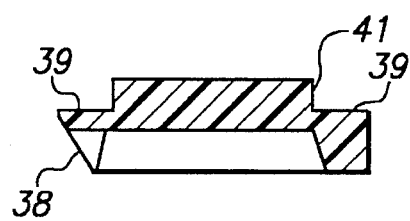
FIG. 7 is a sectional of the slide component of FIG. 1.

Referring to FIG. 1, there is shown a bottom view of a diskette housing 9 that includes length and width and thickness dimensions which are in accordance with standards requirements for 3.5" floppy magnetic diskette packages (or cartridges). Referring to FIG. 2, there is shown an expanded view of a peripheral recess 17 in the diskette housing 9. Referring to FIG. 3, there is shown a sectional view of the peripheral recess 17. The diskette cartridge 9 commonly has upper and lower faces 11, 13 of half-side housing components that are joined along seam 15 to enclose a magnetic disk disposed to be rotated by a spindle of a disk drive mechanism (not shown for clarity) that is oriented to couple to drive hub 7 for rotation about an axis that is perpendicular to the plane of the drawing. The upper and lower faces 11, 13 may be formed of, for example, Acrylonitrile-Butadiene-Styrene (ABS) or High-Impact Polystyrene (HIPS). Such conventional magnetic diskette cartridges commonly include a slider or shutter 5 over an access port 6 for a magnetic transducer to interact with a surface or surfaces of the magnetic diskette within the housing 11, 13, and also include a write-protect indicator (or slide component) 8 within a recess 17 in the rear peripheral edge of the diskette cartridge near a corner thereof for positioning therein the tab or slide component 8 that indicates the write-protect condition of the diskette. The recess 17 and the slide component 8 therein is aligned with a transducer or switch in conventional diskette-utilizing equipment to detect the absence or presence of the slide component 8 at a selected location as an indication of the write-protected or write-unprotected condition of the disk within the diskette cartridge. The recess 17 has an aperture 21 of selected length 22 that is less than the internal length 25 of the write protect cavity and of selected width 29 that is less than the internal width 27 of the write protect cavity. As illustrated in the sectional view of FIG. 3, the recess 17 is relieved internally to a larger length 25 and width 27 below the peripheral edge (and, to a depth through the housing) in order to provide a captivating surface flange 48 around the aperture 21. Recessed slide tracks beneath the surface flange 48 around the aperture 21 may provide the captivating guides for a slide component 8 within the recess 17. As illustrated in the expanded view of FIG. 2, the recess 17 has two bumps 28, 30 on each length 25 positioned for engaging the slide component 8, as described later herein, to lock the slide component 8 and to provide the write-protected or write-unprotected conditions, respectively.

Referring now to FIGS. 4, 5, 6, and 7, there are shown top (or plan) view, bottom view, edge view, and sectional view, respectively, of the slide component 8 including a body 31 having legs 32, 33 spaced apart, substantially parallel to each other, and each attached on one end to opposite ends of a common edge 34 of the body 31. The sum of the length dimensions of both the leg 32 and an edge 37 of the body 31 adjacent the leg 32 is larger than the length dimension 22 of the aperture 21. The sum of the length dimensions of both the leg 33 and an edge 38 of the body 31 adjacent the leg 33 is smaller than the length dimension 22 of the aperture 21. The leg 32 has a foot 35 on an end of the leg opposite the end of the leg attached to the body 31 extending outwardly from the body 31 and substantially orthogonal to the leg 32. Similarly, the leg 33 has a foot 36 on an end of the leg 33 opposite the end of the leg 33 attached to the body 31 extending outwardly from the body 31 and substantially orthogonal to the leg 33. The feet 35, 36 are positioned for engaging the bumps 28, 30 of the recess 17, as described later herein. The edge 38 of the body 31 is chamfered at an angle greater than 90° relative to the bottom of the body 31 to facilitate inserting the slide component 8 into the recess 17 of the assembled diskette housing 9 without permanent deformation of the legs 32, 33, the body 31, or the housing 9. The body 31 of the slide component 8 is substantially rectangular with a width slightly wider than the width of the aperture 21 and with a height 41 above the corner tabs 39 that may protrude through the aperture 21 to the surface of the bottom face of the diskette cartridge. This slide component 8 thus formed of a relatively flexible, resilient material, such as polyoxymethylene (POM), may thus be inserted along the edge 37 into the recess formed in the diskette housing, through the surface aperture 21 after the housing is sealed along seam 15, and then rotated into position by camming the chamfered edge 38 of the body 31 along the surface flange 48 to serve as a captivated slide component within the recess that can be positioned between ends of the aperture to identify the write-protected or write-unprotected conditions of the magnetic disk within the cartridge.

Figure 8:
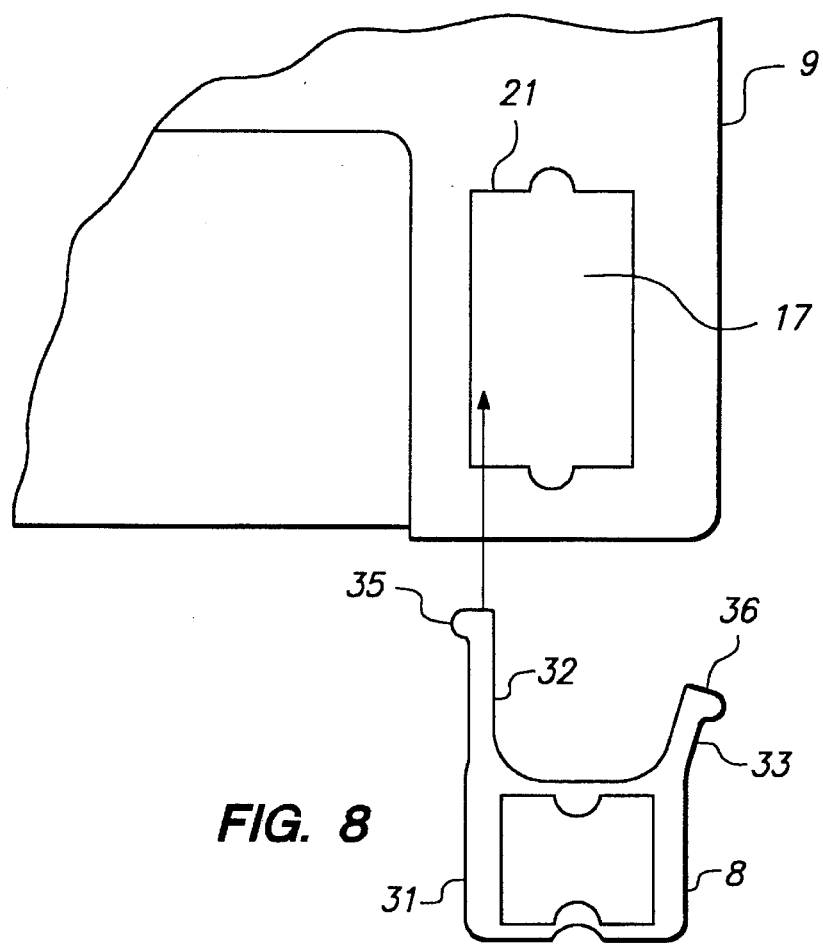
FIG. 8 is a bottom plan view of the diskette housing and of the slide component of FIG. 1 positioned for insertion into the peripheral recess.
Figure 9:
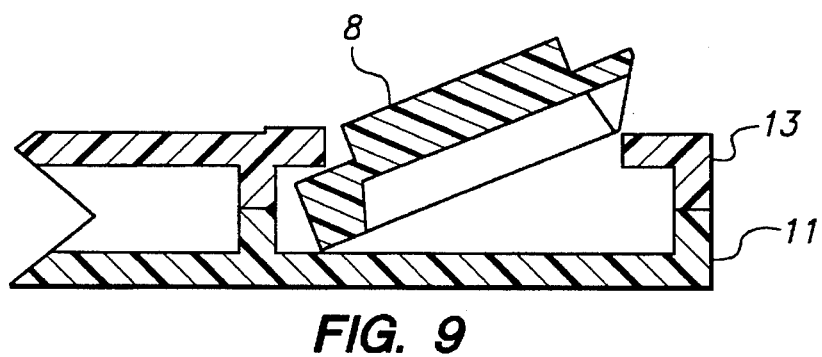
FIG. 9 is a sectional view of the slide component of FIG. 4 being inserted into the peripheral recess.
Figure 10:
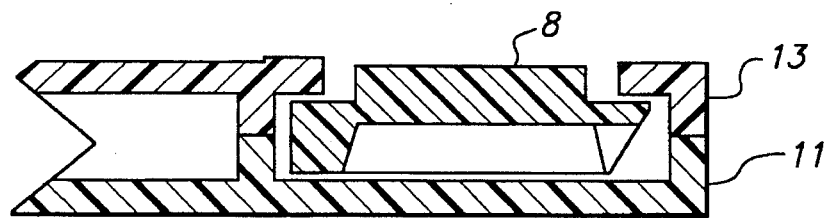
FIG. 10 is a sectional view of the slide component of FIG. 4 rotated into the peripheral recess for slideable movement within the recess.

In accordance with the preferred embodiment of the present invention, the slide component 8 has a selected width dimension 44 that is greater than the width dimension 29 of the aperture 21 but less than the width 27 of the recess 17. In an initial orientation, as shown in FIG. 8, the leg 32 is inserted into the recess 17 through the aperture 21 so that the leg 32 and the edge 37 of the body 31 engage one side of the recess 17 as shown in FIG. 9. Thereafter, the slide component 8 is rotated within the recess 17 with the chamfered edge 38 camming along the captivating flange 48 of the aperture 21 so that the bottom of the slide component 8 engages the bottom surface of the recess 17, as illustrated in FIG. 10. In this orientation, the width dimension of the slide component 8 fits within the internal width 27 of the recess 17, and under the captivating flange 48 around the aperture 21. Of course, slide tracks may also be disposed within the internal walls of the recess 17 to retain the slide component 8 captive therein and to guide the slide component 8 between positions. The width dimension of the slide component 8 is sufficiently smaller than the length of the recess 17 to facilitate slideable movement within the recess 17 along the axis of the length dimension thereof. The slide component 8 is formed of relatively flexible, resilient material, as previously described, to accommodate the compression and distortion encountered when rotating the slide component 8 into position, as shown in FIGS. 9 and 10.

In a write-protected condition, the foot 35 of the leg 32 engages the camming surface 28 for securing the slide component 8 in a first position. In a write-unprotected condition, the foot 35 of the leg 32 engages the camming surface 30 and the foot 36 of the leg 33 engages the camming surface 28 on the opposite side of the recess 17 for securing the slide component 8 in a second position. Movement of the slide component 8 within the recess 17 causes the feet 35, 36 to move along the camming surfaces 28, 30 to thereby deflect the respective legs 32, 33, which in turn apply a spring force against the wall of the recess. Such a spring force secures the slide component in the first and second positions. The legs 32, 33 are asymmetrical in length to facilitate the insertion of the slide component 8 into the recess 17. The shorter leg 33 allows the slide component 8 to move into a middle position in the recess 17 before snapping it therein. In the middle position, the level of strain on the slide component 8 during the insertion is reduced. At least one leg may be attached to the body 31 at an angle extending outwardly from parallel to provide a greater spring force to thereby increase the frictional force of the foot against the wall of the recess 17.

Therefore, the present invention provides a diskette cartridge having a slide component for indicating a write-protected condition or not. The longer leg and one edge of the slide component is first inserted into the recess and rotated into place by camming a chamfered edge and the shorter leg of the slide component relative to the surface flange of the recess.

We claim:

1. A diskette cartridge for a magnetic disk that is disposed for rotation within a housing, the diskette cartridge comprising:

a recess near a peripheral edge of the housing having selected length and width dimensions and including an aperture for access thereto having an opening width dimension smaller than the recess width dimension; and a slide component including a body having a width dimension smaller than the width dimension of the recess, and having a length dimension smaller than the length dimension of the aperture and including first and second legs spaced apart and substantially parallel and each attached on one end to opposite ends of an edge of the body, the combined length dimensions of the first leg and the body being larger than the length dimension of the aperture, the combined length dimensions of the second leg and the body being smaller than the length dimension of the aperture for first admitting insertion of the first leg and a second edge of the body adjacent the first leg along a first portion of the aperture and for subsequently admitting insertion of the remainder of the body and the second leg along another portion of the aperture opposite the first portion to support slideable movement of the slide component within the aperture and recess in an orientation along the length of the recess, the body having a chamfer on an underside of a third edge adjacent the second leg to facilitate the insertion thereof within said recess.

2. The diskette cartridge according to claim 1 wherein the body of the slide component is a substantially rectangular body and the chamfer is at an angle greater than 90° relative to a bottom of the body.

3. The diskette cartridge according to claim 1 wherein the slide component is formed of a flexible, resilient material.

4. The diskette cartridge according to claim 1 wherein the body has dimensions smaller than the width of the aperture for protruding therethrough in one orientation of the slide component.

5. The diskette cartridge according to claim 1 wherein the first leg of the slide component has a foot attached to an end of the first leg opposite said one end and extending outwardly and orthogonal to the leg and wherein the recess has first and second bumps on a wall adjacent the first leg and is positioned with the foot of the first leg engaging the first bump with the slide component in a first position in the recess, and engaging the second bump with the slide component in a second position in the recess.

* * * * *